Dec. 11, 1934. S. KENNY 1,983,614

LICENSE PLATE FRAME

Filed Oct. 4, 1934

Inventor

SARAH KENNY

By Bailey & Carson

Attorneys

Patented Dec. 11, 1934

1,983,614

UNITED STATES PATENT OFFICE 1,983,614

LICENSE PLATE FRAME

Sarah Kenny, Bronx, N. Y.

Application October 4, 1934, Serial No. 746,894

5 Claims. (Cl. 40—125)

My invention relates to license plate frames and more particularly to such frames of the knockdown type which can be placed on the license plate by the purchaser without requiring any special skill.

The primary object of my invention is to provide a very simple frame of this type which is formed of only two parts both of which are exactly similar so that it can be manufactured inexpensively and will yet have a satisfactory and ornamental appearance.

A further object of my invention is to produce such a frame which, although it is formed in two parts, when it is in use gives substantially the appearance of a continuous tube of uniform diameter around the license plate.

Still another object is to provide means which will clamp the frame securely with respect to the plate, so as to prevent any possibility of rattling. These means are preferably the same means which are used for securing the two parts of the frame together.

An additional object is to provide a license plate frame which combines all of the advantages listed above and which is simple and yet ornamental.

The invention consists in general of a license plate frame composed of two exactly similar parts tubular in cross section, and each having one of its ends reduced so as to fit into the open end of the other. The parts are preferably U-shaped, and are provided with a slot along the inner wall of the tube extending the whole length thereof. Screws are provided passing through the telescoping parts of the two tubes, and these screws both serve to secure the parts together and also extend through the inner of the telescoping parts to engage the license plate and clamp it securely in the frame.

Further objects and advantages of my invention will appear more fully from the following description, particularly when taken in conjunction with the accompanying drawing which forms a part thereof.

Figure 1:
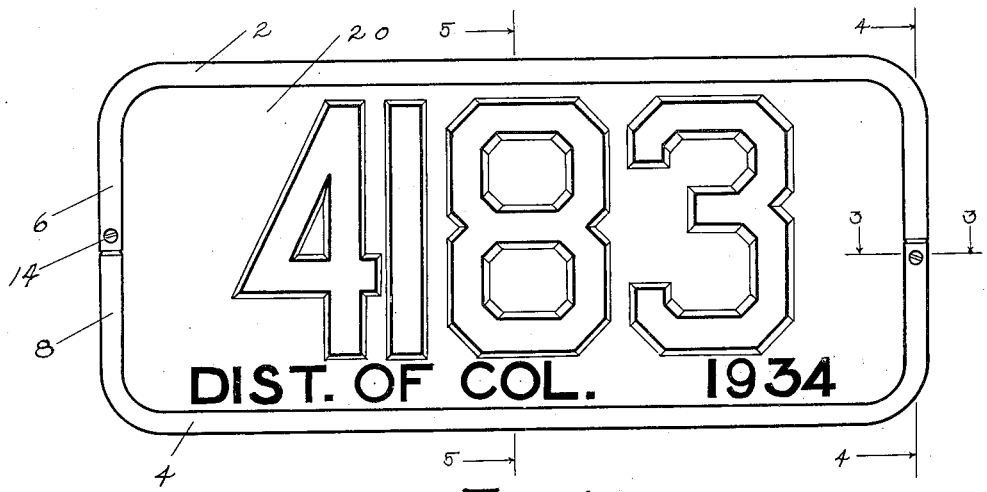
Fig. 1 is a front elevation of my frame as applied on a license plate.
Figure 2:
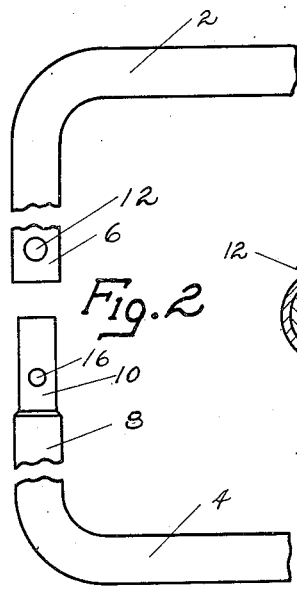
Fig. 2 is an enlarged view of one end of the device, with the frame sections separated.

The frame consists in general of upper and lower sections 2 and 4 which are exactly similar. These sections are U-shaped, thus providing legs 6 and 8 on the members 2 and 4 respectively. The ends of the left hand leg 6 and the right hand leg 8 are swaged down or reduced in cross section as at 10. The reduced section is of just the proper size to fit into the open end of the opposed leg, and to slide thereinto until the reduced section is substantially concealed so that the appearance of a continuous tube of uniform cross section is practically obtained.

The unreduced ends of the legs are provided with holes 12 through which pass screws 14 threadedly engaging in openings 16 in the reduced portions. These openings are so located that when they are aligned the parts are in the desired position with the reduced sections entirely telescoped in the large ends.

Figure 3:
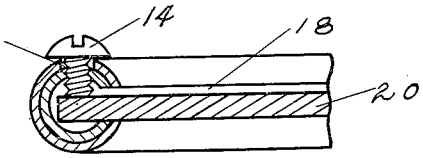
Fig. 3 is a cross section on the line 3—3 of Fig. 1.
Figure 4:
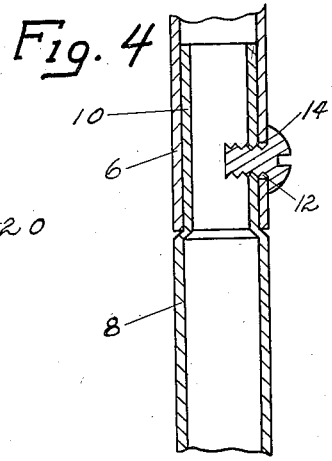
Fig. 4 is a partial cross section on the line 4—4 of Fig. 1, the license plate being omitted.
Figure 5:
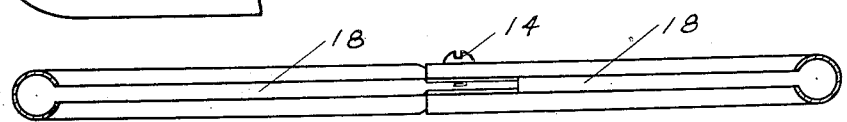
Fig. 5 is a cross section on the line 5—5 of Fig. 1, the license plate being omitted.

The members 2 and 4 are preferably tubular in cross section, and are formed of metal which may be finished in any suitable fashion, for instance by chromium plating. Slots 18 extend completely around the inner portions of the tubular members, thus providing a means which permits the edge of the license plate to enter into the tubular elements. As is evident from Fig. 3, the license plate 20 when in position is engaged by the end of the screw 14 which is passed through the opening 16. The screw engages the license plate and clamps the frame tightly on the plate so as to prevent any possibility of rattling between the frame and the plate.

In order to put the frame in position on the license plate, the two parts are separated and part 4 is pushed up from below until the edge of the license plate passes through the slot 18. The other part 2 is similarly pushed down from above, until the reduced sections 10 of each part enter the ends of the opposed unreduced legs of the other part. The two parts then are secured together by screws 14, which both hold the sections 2 and 4 to one another and also clamp the license pate with respect to the frame so that no rattling can occur.

It is evident that my device is extremely simple, being composed of only two parts, and is therefore economical to manufacture. At the same time, it is easy to put in position on the license plate and yet gives a continuous appearance of an unbroken tubular frame, thereby rendering it extremely ornamental.

While I have described herein one embodiment of my invention, it is obvious that various changes could be made therein without departing from the spirit of the same, and I therefore wish it to be understood that I do not intend to limit myself by the description except within the scope of the appended claims.

I claim:

1. In combination with a license plate, a frame comprising a plurality of sections, some of said sections telescoping with one another, said sections being hollow and provided with slots along their inner walls, the license plate entering into the sections including the telescoping portions thereof through said slots, and means extending through both said telescoping portions to secure the same together and engaging said license plate to clamp the frame on the license plate and thereby to prevent rattling of the frame.

2. A license plate frame comprising two U-shaped sections of tubular cross-section each having a continuous slot along the whole length of its inner wall to receive the edge of a license plate, said sections being similar and each having one end of one of the legs in the U reduced in cross section to fit into the end of the other leg of the other section whereby said frame when positioned on a license plate has the appearance substantially of a continuous tube of uniform cross section around the license plate, and means extending through the interfitting portions to secure the sections together and to engage the license plate to hold the frame against rattling.

3. In combination with a license plate, a frame comprising a plurality of sections, some of said sections overlapping one another, said frame being adapted to engage the edge of a license plate, and means extending through both the overlapping portions of the sections to secure the same together and engaging said license plate to clamp the frame on the license plate and thereby to prevent rattling of the frame.

4. In combination with a license plate, a frame comprising a plurality of sections, some of said sections telescoping with one another, said sections being hollow and provided with a space on the inner wall, the license plate entering into the telescoping portions through said space, and a screw extending through both said telescoping portions and threadedly engaged in one of them to secure the same together and engaging said license plate to clamp the frame on the license plate and thereby to prevent rattling of the frame.

5. A license plate frame comprising two U-shaped sections of tubular cross-section each having a continuous slot along the whole length of its inner wall to receive the edge of a license plate, said sections being similar and each having one end of one of the legs of the U reduced in cross section to fit telescopically into the end of the other leg of the other section whereby said frame when positioned on a license plate has the appearance substantially of a continuous tube of uniform cross section around the license plate, and a screw extending through both said telescoping portions and threadedly engaged in one of them to hold said sections together, said screw being long enough to engage the license plate to clamp the frame on the plate and thus to prevent rattling of the frame.

SARAH KENNY.